(12) United States Patent
Gondo

(10) Patent No.: US 9,246,632 B2
(45) Date of Patent: Jan. 26, 2016

(54) RECEPTION PROCESSING DEVICE

(75) Inventor: Shunichi Gondo, Tokyo (JP)

(73) Assignee: Kabushiki Kaisha Toshiba, Tokyo (JP)

( * ) Notice: Subject to any disclaimer, the term of this patent is extended or adjusted under 35 U.S.C. 154(b) by 965 days.

(21) Appl. No.: 13/424,443

(22) Filed: Mar. 20, 2012

(65) Prior Publication Data

US 2012/0233516 A1 Sep. 13, 2012

Related U.S. Application Data

(63) Continuation of application No. PCT/JP2009/067085, filed on Sep. 30, 2009.

(51) Int. Cl.
*H03M 13/00* (2006.01)
*H04L 1/00* (2006.01)

(52) U.S. Cl.
CPC .................................. *H04L 1/0045* (2013.01)

(58) Field of Classification Search
CPC ... H01L 1/0045; H01L 1/0057; H01L 1/0061; H01L 1/0041; H01L 1/0083; H01L 1/0072
See application file for complete search history.

(56) References Cited

U.S. PATENT DOCUMENTS

| 2003/0005387 | A1 | 1/2003 | Tsunoda |
| 2007/0300134 | A1* | 12/2007 | Sugai et al. .................. 714/776 |
| 2008/0222494 | A1* | 9/2008 | Gondo et al. ................. 714/776 |

FOREIGN PATENT DOCUMENTS

| JP | 11-136220 A | 5/1999 |
| JP | 2008-11142 A | 1/2008 |
| JP | 2008-131153 A | 6/2008 |
| JP | 2009-206608 A | 9/2009 |
| WO | 2005/86436 A1 | 9/2005 |

OTHER PUBLICATIONS

International Search Report mailed on Dec. 22, 2009, for International Application No. PCT/JP2009/067085 (with English Translation).
International Written Opinionmailed on Dec. 22, 2009, for International Application No. PCT/JP2009/067085.
Li. "RTP Payload Format for Generic FEC" RFC 5109. Dec. 2007. p. 6.
Japanese Office Action issued Jul. 9, 2013 in Patent Application No. 2011-534007 with English Translation.

* cited by examiner

*Primary Examiner* — Albert Decady
*Assistant Examiner* — Enamul M Kabir
(74) *Attorney, Agent, or Firm* — Oblon, McClelland, Maier & Neustadt, L.L.P.

(57) ABSTRACT

According to one embodiment, a reception processing device receives and stores a data packet and a quality enhancement packet. The device includes a third storage unit that stores association between the quality enhancement packet stored in a second storage unit and the data packet stored in a first storage unit, and a fourth storage unit that stores, at each quality enhancement processing, a processing state representing at least one of an interim result and a final result in the quality enhancement processing. The device performs the quality enhancement processing using redundant data included in the quality enhancement packet and the data packet identified by the association and associated with the quality enhancement packet, stores, in the fourth storage unit, the processing state representing the interim result of the operation when interrupting the quality enhancement processing, and resumes the quality enhancement processing by using the processing state.

8 Claims, 6 Drawing Sheets

RECEPTION PROCESSING DEVICE

CROSS-REFERENCE TO RELATED APPLICATIONS

This application is a continuation of PCT international application Ser. No. PCT/JP2009/067085 filed on Sep. 30, 2009, which designates the United States; the entire contents of which are incorporated herein by reference.

FIELD

Embodiments described herein relate generally to a reception processing device.

BACKGROUND

In the related art, a real-time transport protocol (RTP) has been used as a protocol for real-time streaming transmission of video and audio in an IP communication network. With the RTP, while it is possible to resolve a change in the sequence of data and a variation in the transmission interval (referred to as RTP processing), lost data can only be detected but cannot be recovered. Examples of typical techniques for recovering lost data include techniques of retransmitting data and techniques using error correcting codes. The techniques of retransmitting data are not always suitable for application in real-time streaming transmission in terms of time and because of uncertainty of retransmission and difficulty in requesting retransmission. With respect to the techniques using error correcting codes, on the other hand, a recovery process using forward error correction (FEC) coded transmission is known as a practical one. According to the FEC, at a transmitting side, data (referred to as original data) to be transmitted are grouped, the grouped data are operated according to a predetermined technique to generate redundant data for each group, and the redundant data are stored in an FEC packet and transmitted in parallel with the original data. At a receiving side, in a case where part of the original data is lost in each group, it is possible to perform operation on the redundant data associated with the remaining part of the original data according to a predetermined technique to recover the lost original data. Such processing is referred to as quality enhancement processing (FEC processing). Since the redundant data and the original data are transmitted with little delay, immediate recovery is possible at the receiving side and a delay resulting from the processing is smaller as compared to a case where the lost original data are retransmitted. Note that examples of typical FEC schemes to be applied to the RTP include schemes defined in RFC5109 and RFC2733 ("RFC5109-RTP Payload Format for Generic Forward Error Correction", IETF, December 2007, up to 3. Basic Operation).

In the related art, the RTP processing and the FEC processing are separate processes independent of each other. This is for the purpose of hiding and separating the FEC processing that is a secondary processing system and esoteric as compared to the RTP processing that is a primary processing system. This is on the assumption that there is a possibility that the FEC processing cannot be properly performed if all necessary data cannot be provided at a point before inputting necessary data to an FEC processor. More specifically, the FEC processing needs to be started after a period of time required for resolving the change in the sequence and the variation in the transmission interval by performing the RTP processing, and particularly when the variation in the transmission interval is large, the waiting time for the RTP processing also becomes longer. As a result, a wasteful delay time is caused, and the time for propagation between communication devices is increased, which may result in an undesirable condition for a telephone call or real-time transmission of video and the like. On the other hand, if the FEC processing is started without waiting for a required time in the RTP processing, the FEC processing will be incomplete since all necessary data are not provided, and the robustness against packet loss may be lowered.

DETAILED DESCRIPTION

Figure 1:
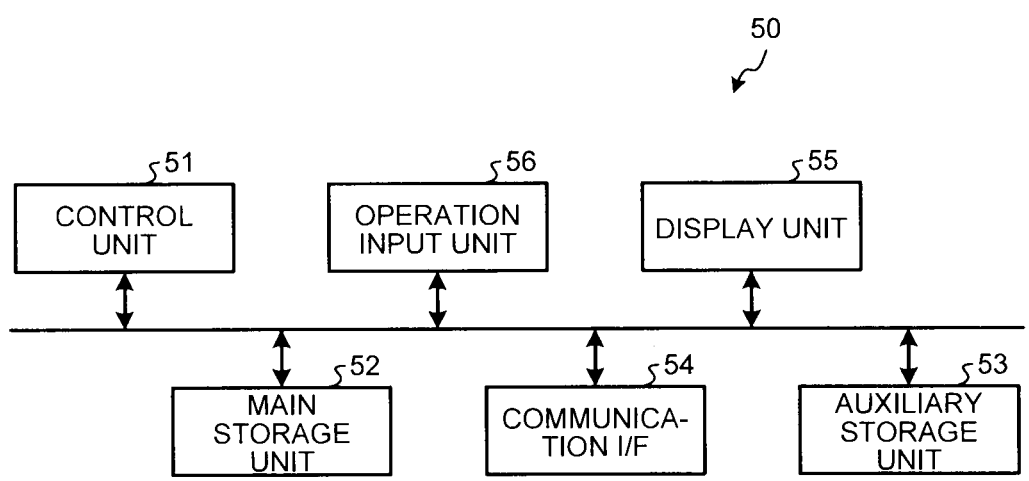
FIG. 1 is a diagram illustrating a hardware configuration of a reception processing device according to an embodiment.

In general, according to one embodiment, a reception processing device includes a first receiving unit, a first storage unit, a second receiving unit, a second storage unit, a first processing unit, a third storage unit, a fourth storage unit, a second processing unit and a third processing unit. The first receiving unit is configured to receive a data packet. The first storage unit is configured to store the data packet. The second receiving unit is configured to receive a quality enhancement packet. The quality enhancement packet includes redundant data for recovering a lost data packet and identification information identifying a plurality of data packets used for generating the redundant data. The second storage unit is configured to store the quality enhancement packet. The first processing unit is configured to resolve disturbance of the data packet. The third storage unit is configured to store association between the quality enhancement packet stored in the second storage unit and the data packet stored in the first storage unit, the data packet being identified by the identification information. The fourth storage unit is configured to store, at each quality enhancement processing performing an operation to recover a lost data packet, a processing state representing at least one of an interim result and a final result of the operation in the quality enhancement processing. The second processing unit is configured to perform the quality enhancement processing using the redundant data included in the quality enhancement packet and the data packet identified by the association and associated with the quality enhancement packet. The second processing unit stores, in the fourth storage unit, the processing state represents the interim result of the operation when interrupting the quality enhancement processing, and resumes the quality enhancement processing by using the processing state. The third processing unit is configured to store, in the first storage unit, a lost first data packet when the first data packet is recovered by the final result of the operation.

An embodiment of a reception processing device will be described below in detail with reference to the accompanying drawings. First, a hardware configuration of a reception processing device 50 will be described referring to FIG. 1. The reception processing device 50 includes a control unit 51 such as a central processing unit (CPU) configured to control the entire device, a main storage unit 52 such as a read only memory (ROM) and a random access memory (RAM) configured to store various data and various programs, an auxiliary storage unit 53 such as a hard disk drive (HDD) and a compact disk (CD) drive configured to store various data and various programs, a communication interface (I/F) 54 configured to control communication of external devices, and a bus that connects these units. This is a hardware configuration using a common computer system. In addition, a display unit 55 configured to display information and an operation input unit 56 such as a keyboard and a mouse configured to receive instructions input by the user are connected to the reception processing device 50 through wired or wireless connections. Such a reception processing device 50 receives FEC packets that are quality enhancement packets and RTP packets that are data packets from a transmitting device 100 that is an external device via the communication I/F 54 and a network NT1 as illustrated in FIG. 2. The network NT1 is, for example, a local area network (LAN), an intranet, an Ethernet (registered trademark), the Internet or the like. The RTP packets and the FEC packets are packets communicated according to the RTP described above, for example.

Figure 3:
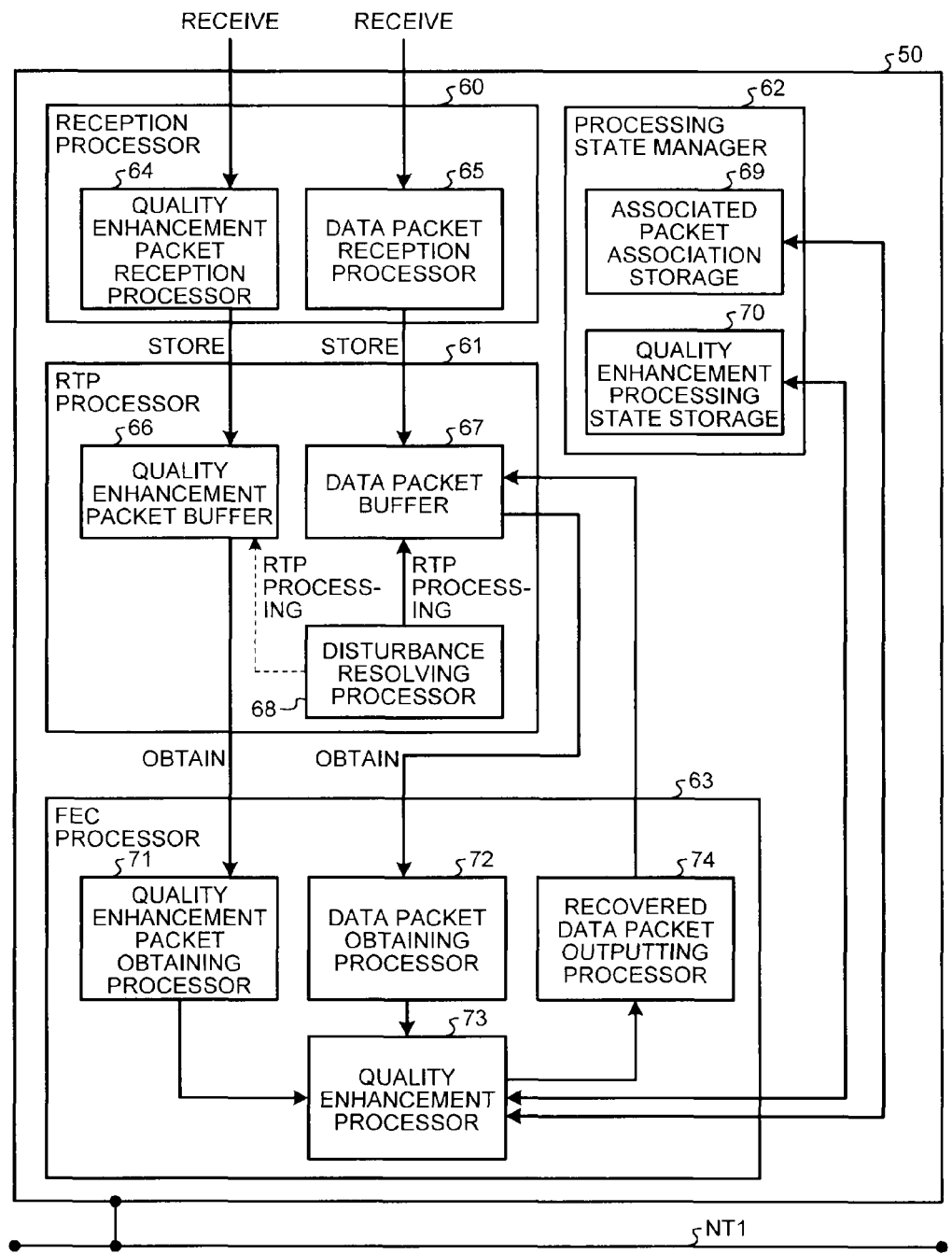
FIG. 3 is a diagram illustrating a functional configuration of the reception processing device.

Next, description will be made on various functions implemented by executing various programs stored in the main storage unit 52 and the auxiliary storage unit 53 by the control unit 51 of the reception processing device 50 with such a hardware configuration. FIG. 3 is a diagram illustrating a functional configuration of the reception processing device 50. The control unit 51 includes a reception processor 60, an RTP processor 61, a processing state manager 62 and an FEC processor 63. The functions of the reception processor 60 are implemented by the communication I/F 54. The functions of the RTP processor 61 are implemented by executing programs by the control unit 51 and by the main storage unit 52. The functions of the processing state manager 62 are implemented by the main storage unit 52. The functions of the FEC processor 63 are implemented by executing programs by the control unit 51.

The reception processor 60 includes a quality enhancement packet reception processor 64 and a data packet reception processor 65. The quality enhancement packet reception processor 64 receives quality enhancement packets (referred to as FEC packets) from the transmitting device 100 via the network NT1. An FEC packet includes a sequence number indicating the sequence given to the FEC packet, redundant data for recovering a lost data packet (referred to as an RTP packet), and RTP packet identification information identifying RTP packets used for generating the redundant data. Redundant data are data generated by an XOR (exclusive OR) operation as a predetermined operation using a plurality of RTP packets associated in advance in the transmitting device 100. For example, the RTP packet identification information may be sequence numbers given to the RTP packets or operation values obtained by operations in a predetermined manner (in a reconfigurable manner) by using the sequence numbers. The association between RTP packets and an FEC packet is identified by the RTP packet identification information. The data packet reception processor 65 receives RTP packets from the transmitting device 100 via the network NT1. An RTP packet includes media data representing video and audio, a sequence number, a time stamp and the like, for example.

The RTP processor 61 includes a quality enhancement packet buffer 66, a data packet buffer 67 and a disturbance resolving processor 68. The quality enhancement packet buffer 66 buffers (stores) FEC packets received by the quality enhancement packet reception processor 64. The data packet buffer 67 buffers RTP packets received by the data packet reception processor 65. The disturbance resolving processor 68 performs RTP processing for resolving disturbance (in particular, a change in the sequence and a variation in the transmission interval) of RTP packets received by the data packet reception processor 65. Specifically, the disturbance resolving processor 68 appropriately changes the sequence of the RTP packets so that the RTP packets received by the data packet reception processor 65 are arranged in the ascending order of the sequence number in the data packet buffer 67 or waits for RTP packets to be received with a delay caused by occurrence of jitter, for example. In addition, the disturbance resolving processor 68 may perform RTP processing for resolving disturbance of FEC packets received by the quality enhancement packet reception processor 64 in the quality enhancement packet buffer 66.

The processing state manager 62 includes an associated packet association storage 69 and a quality enhancement processing state storage 70. The association storage 69 stores association between an FEC packet stored in the quality enhancement packet buffer 66 and RTP packets associated with the FEC packet and stored in the data packet buffer 67 under the control of a quality enhancement processor 73, which will be described later. The quality enhancement processing state storage 70 stores, at each quality enhancement processing (referred to as FEC processing) performing an XOR operation as a predetermined operation by the quality enhancement processor 73, a processing state representing at least one of an interim result and a final result of the operation of the FEC processing under the control of the quality enhancement processor 73. Details of the FEC processing and the processing state will be described later.

The FEC processor 63 includes a quality enhancement packet obtaining processor 71, a data packet obtaining processor 72, the quality enhancement processor 73 and a recovered data packet outputting processor 74. The quality enhancement packet obtaining processor 71 reads and obtains FEC packets from the quality enhancement packet buffer 66. The data packet obtaining processor 72 reads and obtains RTP packets from the data packet buffer 67. The quality enhancement processor 73 performs the FEC processing of performing an operation using an FEC packet obtained by the quality enhancement packet obtaining processor 71 and RTP packets associated with the FEC packet and obtained by the data packet obtaining processor 72 according to a predetermined technique to recover a lost RTP packet. Specifically, for example, the quality enhancement processor 73 uses redundant data included in an FEC packet and one RTP packet associated with the FEC packet to perform an XOR operation thereof, and obtains an interim result of the operation (referred to as an operation result). The quality enhancement processor 73 then performs an XOR operation of the operation result and another RTP packet associated with the FEC packet to obtain an operation result. When there are three or more RTP packets associated with the FEC packet, the quality enhancement processor 73 repeats the XOR operation of an immediately preceding operation result and one RTP packet that has not been used for the operation. In this manner, the quality enhancement processor 73 performs an XOR operation for each RTP packet associated with an FEC packet to obtain an operation result, and if there is a lost RTP packet among the RTP packets associated with the FEC packet, the RTP packet can be obtained as a final result of the operations. Thus, the lost RTP packet is recovered. If there is no lost RTP packet in the RTP packets associated with the FEC packet, on the other hand, the quality enhancement processor 73 can nullify the final result of the operations.

Moreover, in the embodiment, the quality enhancement processor 73 detects whether or not a new FEC packet is buffered in the quality enhancement packet buffer 66, detects whether or not a new RTP packet is buffered in the data packet buffer 67, and stores association of the FEC packet buffered in the quality enhancement packet buffer 66 and the RTP packet buffered in the data packet buffer 67 among RTP packets associated with the FEC packet in the association storage 69. Note that an RTP packet associated with an FEC packet can be identified by using the RTP packet identification information described above. The association may be in a form of a matrix of a sequence number of an FEC packet and a sequence number of an RTP packet associated with the FEC packet or a graph in which these sequence numbers are linked, for example.

Then, when starting the FEC processing, the quality enhancement processor 73 refers to the association stored in the association storage 69, and performs the FEC processing using an FEC packet to be processed and an RTP packet that has not been used for the XOR operation described above in the FEC processing on the FEC packet among RTP packets associated with the FEC packet and buffered in the data packet buffer 67. Then, when the XOR operation using the RTP packet is completed, the quality enhancement processor 73 stores a processing state indicating the sequence number of the FEC packet being processed and the sequence number given to the RTP packet used for the XOR operation and the operation result in the quality enhancement processing state storage 70. If there is a lost RTP packet among the RTP packets associated with the FEC packet when the FEC processing is completed, the quality enhancement processor 73 obtains the RTP packet that is the final result of operations as the processing state and outputs the obtained RTP packet to the recovered data packet outputting processor 74, deletes the processing state of the FEC processing on the FEC packet from the quality enhancement processing state storage 70, and ends the FEC processing. On the other hand, if there is no lost RTP packet among the RTP packets associated with the FEC packet when the FEC processing is completed, the quality enhancement processor 73 nullify the processing state of the FEC processing on the FEC packet by deleting the processing state from the quality enhancement processing state storage 70, and ends the FEC processing.

The recovered data packet outputting processor 74 outputs the RTP packet recovered and output by the quality enhancement processor 73 to the data packet buffer 67. In this process, the recovered data packet outputting processor 74 buffers the RTP packet in the data packet buffer 67 by inserting the RTP packet so that RTP packets are arranged in the ascending order of the sequence number described above in the data packet buffer 67. Note that the RTP packets buffered in the data packet buffer 67 are sequentially passed to a predetermined application program, and reproduction using the RTP packets is performed by the function of the application program.

Next, procedures of reception processing performed by the reception processing device 50 according to the embodiment will be described referring to FIG. 4. Upon receiving an RTP packet by the functions of the data packet reception processor 65 (YES in step S1), the reception processing device 50 buffers the RTP packet in the data packet buffer 67 (step S2), and upon receiving an FEC packet by the functions of the quality enhancement packet reception processor 64 (YES in step S3), the reception processing device 50 buffers the FEC packet in the quality enhancement packet buffer 66 (step S4). In addition, the reception processing device 50 performs RTP processing for resolving disturbance (in particular, a change in the sequence and a variation in the transmission interval) of RTP packets in the data packet buffer 67 (and the quality enhancement packet buffer 66) by the functions of the disturbance resolving processor 68 (step S5).

Moreover, the reception processing device 50 detects whether or not a new FEC packet is buffered in the quality enhancement packet buffer 66, detects whether or not a new RTP packet is buffered in the data packet buffer 67, and stores, in the association storage 69, association between the FEC packet buffered in the quality enhancement packet buffer 66 and the RTP packet buffered in the data packet buffer 67 among RTP packets associated with the FEC packet by the functions of the quality enhancement processor 73 (step S6).

In addition, the reception processing device 50 reads and obtains an FEC packet to be processed from the quality enhancement packet buffer 66 by the functions of the quality enhancement packet obtaining processor 71 (YES in step S7). Then, the reception processing device 50 refers to the association stored in the association storage 69 to obtain RTP packets buffered in the data packet buffer 67 among RTP packets identified by the RTP packet identification information included in the FEC packet obtained in step S6 by the functions of the data packet obtaining processor 72 (step S8). The number of RTP packets obtained in this step may be one or more than one. Then, the reception processing device 50 starts FEC processing using the FEC packet obtained in step S7 and the RTP packets obtained in step S8 by the functions of the quality enhancement processor 73 (step S9). Then, in the FEC processing, the reception processing device 50 performs an XOR operation of the FEC packet and one RTP packet associated with the FEC packet, and repeats the XOR operation of an immediately preceding operation result and one RTP packet that has not been used for the operations as described above. When the XOR operations have been finished using all of the RTP packets obtained in step S8, the reception processing device 50 stores the processing state of the FEC processing in the quality enhancement processing state storage 70 (step S10). If the FEC processing is completed and the final operation result is obtained as the processing state (YES in step S11) and if a lost packet is obtained as the processing state (YES in step S12), the reception processing device 50 outputs the packet to the data packet buffer 67 through the functions of the recovered data packet outputting processor 74 (step S13). As a result, the recovered RTP packet is buffered in the data packet buffer 67. In addition, the reception processing device 50 deletes the processing state from the quality enhancement processing state storage 70 by the functions of the quality enhancement processor 73 and ends the FEC processing (step S14). Note that, even when the FEC processing is completed and the final operation result is obtained as the processing state (YES in step S11), if there is no lost RTP packet among the RTP packets associated with the FEC packet (NO in step S12), the reception processing device 50 deletes the processing state from the quality enhancement processing state storage 70 by the functions of the quality enhancement processor 73 in step S14, and ends the FEC processing.

If the FEC processing is not completed when the XOR operations are finished using all of the RTP packets obtained in step S8 (NO in step S11), the reception processing device 50 interrupts the FEC processing (step S17). The reception processing device 50 then returns to step S1 to obtain a new FEC packet and a new RTP packet.

Note that, if no FEC packet can be obtained from the quality enhancement packet buffer 66 in step S7 (NO in step S7), the reception processing device 50 refers to the processing state stored in the quality enhancement processing state storage 70 and determines whether or not there is an FEC packet for which the FEC processing is interrupted in step S17 described above and is thus not completed (step S15). If there is an FEC packet for which the FEC processing is not completed (YES in step S15), the reception processing device 50 refers to the processing state stored in the quality enhancement processing state storage 70 and to the association stored in the association storage 69 to obtain an RTP packet that is buffered in the data packet buffer 67 and that has not been used for an XOR operation in the FEC processing on the FEC packet among RTP packets identified by the RTP packet identification information included in the FEC packet by the functions of the data packet obtaining processor 72 (step S16). Then, in step S9, the reception processing device 50 resumes the FEC processing by using the RTP packet obtained in step S8 and the processing state stored in the quality enhancement processing state storage 70. In this process, the reception processing device 50 can identify which FEC packet is to be processed, the XOR operation result when the FEC processing on the FEC packet is interrupted, and which RTP packet among the RTP packets associated with the FEC packet to be processed is used for the operation based on the processing state stored in the quality enhancement processing state storage 70. Therefore, the reception processing device 50 can resume the FEC processing using the operation result indicated in the state of the FEC processing when interrupted and the RTP packets obtained in step S8. Then, the reception processing device 50 proceeds to step S10. Note that, if the result of determination in step S15 is negative (NO in step S15), the reception processing device 50 returns to step S1 to obtain a new FEC packet and a new RTP packet.

As described above, the association between an FEC packet and RTP packets received in association with the FEC packet and the state of FEC processing are stored, which allows interruption and resumption of the FEC processing according to reception of RTP packets at each FEC processing. Specifically, in a communication scheme such as the RTP in which large jitter is allowed, the RTP processing for resolving disturbance such as a change in the sequence and a variation in the transmission interval and the FEC processing can be performed in parallel. In addition, when there is a plurality of FEC packets, FEC processing on one FEC packet can be started without waiting for completion of FEC processing on another FEC packet.

With such a configuration, FEC processing can be completed even if the FEC processing is started without waiting for a period of time required for resolving disturbance in RTP processing. In the related art, FEC processing needs to be started after elapse of a period of time required for resolution of disturbance in RTP processing, and particularly when a variation in the transmission interval is large, the required waiting time in the RTP processing becomes longer as a result, and a wasteful delay time may thus be caused. For example, when reception of DATA 400 that is an RTP packet associated with an FEC packet is delayed as illustrated in (a) of FIG. 5, a wasteful delay time is caused if FEC processing is performed after the DATA 400 is received, and on the other hand, the FEC processing will be incomplete since all necessary data are not provided and the robustness against lost packets may be lowered if the FEC processing is started without waiting for a required period of time in the RTP processing. In the embodiment, however, with the configuration described above, a wasteful delay time caused in FEC processing can be resolved and the robustness against packet loss can be maintained when FEC processing is employed in a communication scheme such as the RTP in which large jitter is allowed. Specifically, in an example of (b) of FIG. 5, a wasteful delay time can be reduced even if reception of an RTP packet is delayed since FEC processing is started as soon as an FEC packet 401 is received and the FEC processing becomes ready to be started. As a result, it is possible to further suppress an increase in time for data propagation between a transmitting device and a reception processing device that is important in real-time transmission of video and audio for video distribution, telephone calls and the like.

In the embodiment described above, various programs executed in the reception processing device 50 may be stored on a computer system connected to a network such as the Internet, and provided by being downloaded via the network. The various programs may also be recorded on a computer readable recording medium such as a CD-ROM, a flexible disk (FD), a CD-R and a digital versatile disk (DVD) in a form of a file that can be installed or executed, and provided as a computer program product.

Figure 6:
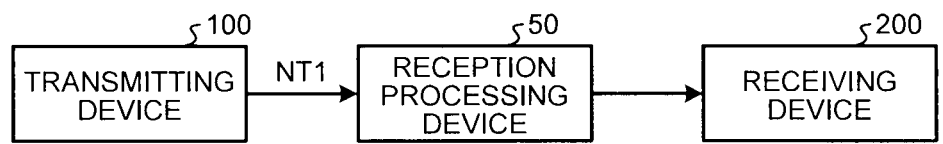
FIG. 6 is a diagram illustrating a mode of reception and a mode of transmission of the reception processing device.

In the embodiment described above, the reception processing device 50 may transmit, to a receiving device 200, an RTP packet and an FEC packet received from a transmitting device 100 and on which reception processing is performed as illustrated in FIG. 6. The reception processing device 50 and the receiving device 200 may be connected via a network similar to the network NT1 described above or may be connected via a network different from the network NT1 or a dedicated line.

Figure 2:
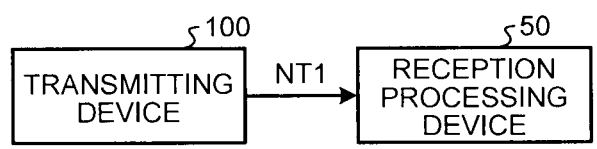
FIG. 2 is a diagram illustrating a mode of reception of the reception processing device.

In the embodiment described above, the order in which steps S1, S3 and S6 in FIG. 1 are performed is not limited to the example described above. The reception processing device 50 may perform step S3 after step S1, or may perform the processing of step S6 without being in synchronization with steps S1 and S3, that is, may refer to the quality enhancement packet buffer 66 and the data packet buffer 67 at an arbitrary or predetermined timing and perform the processing of step S6 according to the state of buffering at the timing.

In the embodiment described above, XOR operations are used for an operation used for generating redundant data and an operation performed in FEC processing, but the operations are not limited thereto.

Figure 4:
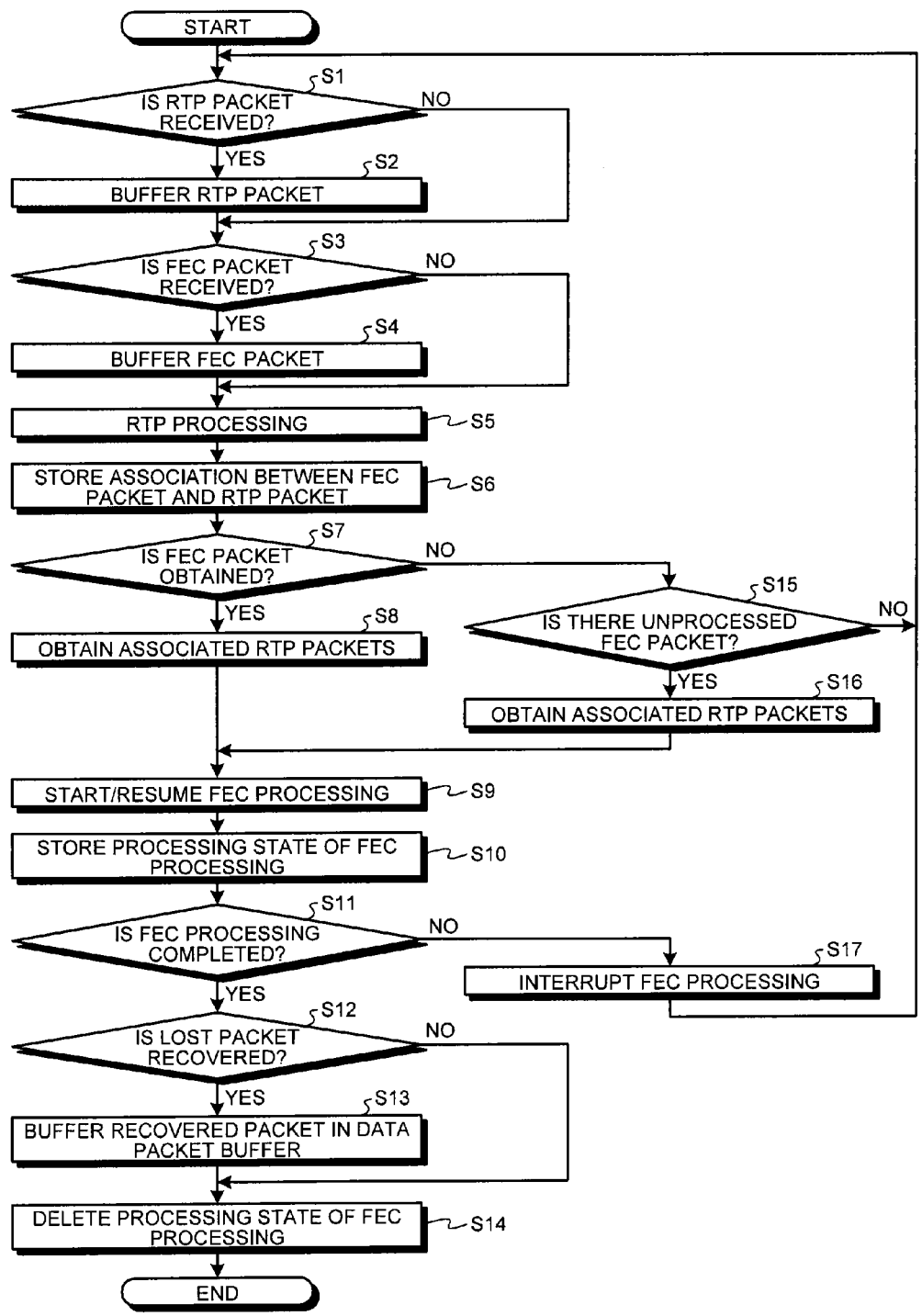
FIG. 4 is a flowchart illustrating procedures of reception processing performed by the reception processing device.

In the embodiment described above, the timing at which the reception processing device 50 performs FEC processing in step S9 in FIG. 4 may be an arbitrary timing or at every predetermined period of time.

Figure 7:
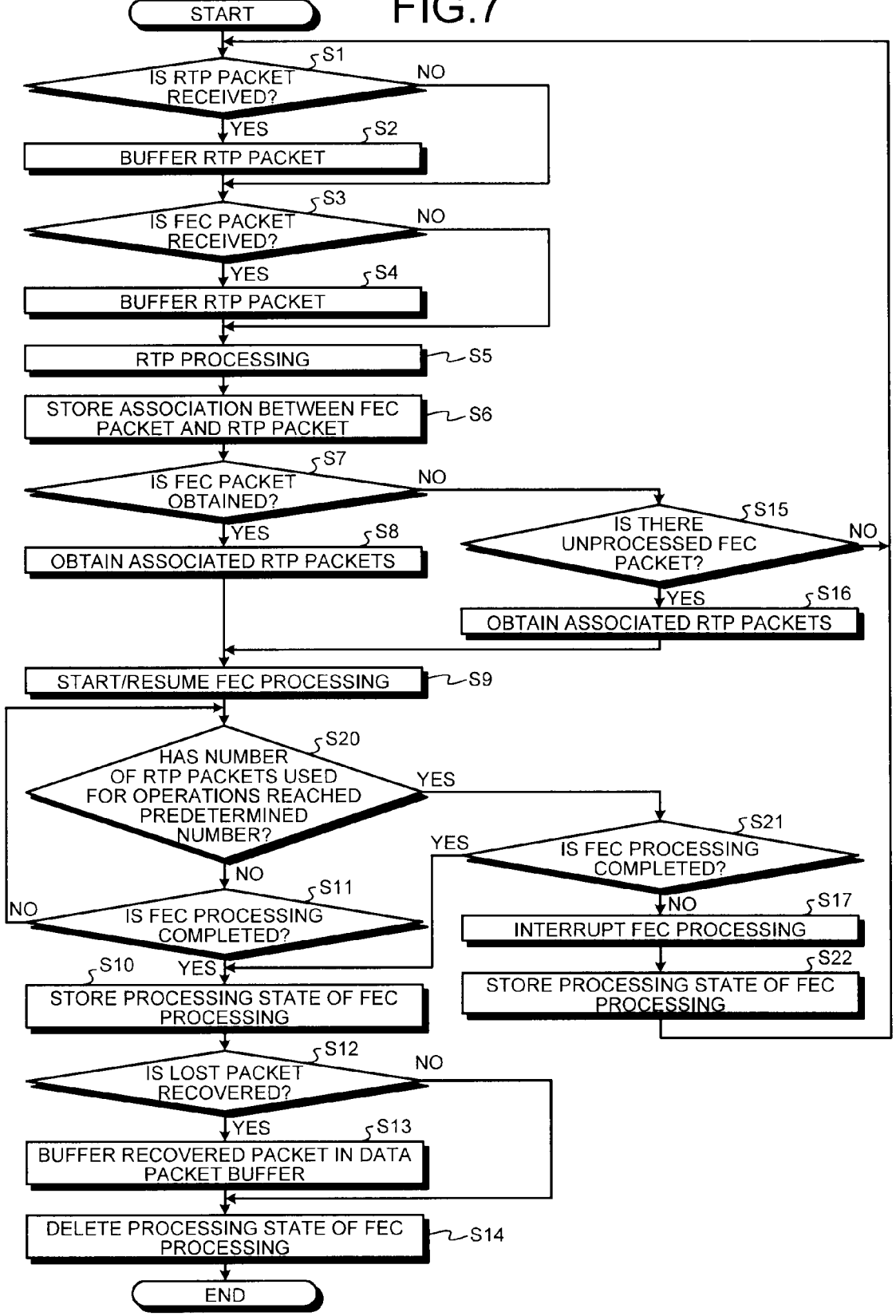
FIG. 7 is a flowchart illustrating procedures of reception processing performed by a reception processing device according to a modified example.

In the embodiment described above, after starting the FEC processing, the reception processing device 50 finishes XOR operations using all of the RTP packets obtained in step S8 in step S9 in FIG. 4, and interrupts the FEC processing in step S17 when the FEC processing is not completed. However, the processing is not limited thereto, and the reception processing device 50 may interrupt the FEC processing each time an XOR operation using a predetermined number of RTP packets is performed, for example. FIG. 7 is a flowchart illustrating procedures of reception processing according to the modified example. Steps S1 to S9 are the same as those in the embodiment described above. Note that, in step S9, when starting the FEC processing, the reception processing device 50 starts to count the number of RTP packets used for XOR operations. In step S20, the reception processing device 50 determines whether or not the number of RTP packets used for the XOR operations has reached a predetermined number, and if the result of the determination is positive (YES in step S20) and the FEC processing is not completed (NO in step S21), the FEC processing is interrupted (step S17). In this case, the reception processing device 50 resets the counted number of RTP packets. Then, the reception processing device 50 stores the processing state of the FEC processing at this time in the quality enhancement processing state storage 70 (step S22) and returns to step S1. In addition, if the number of RTP packets used for the XOR operations has not reached the predetermined number (NO in step S20) but the FEC processing is completed (YES in step S11), that is, if the number of remaining RTP packets as a result of excluding RTP packets for which the FEC processing is performed in units of a predetermined number but the FEC processing is completed by performing XOR operations using the remaining RTP packets, the reception processing device 50 performs the processing in step S10 and subsequent steps. Steps S12 to 14 are the same as those in the embodiment described above. Similarly, if the result of determination in step S21 is positive, the reception processing device 50 performs processing in step S10 and subsequent steps. Note that, when the interrupted FEC processing is to be resumed in step S9, the reception processing device 50 resumes the FEC processing using the RTP packets obtained in step S8 and the processing state stored in the quality enhancement processing state storage 70. In addition, the reception processing device 50 newly starts counting the number of RTP packets used for XOR operations.

Figure 5:
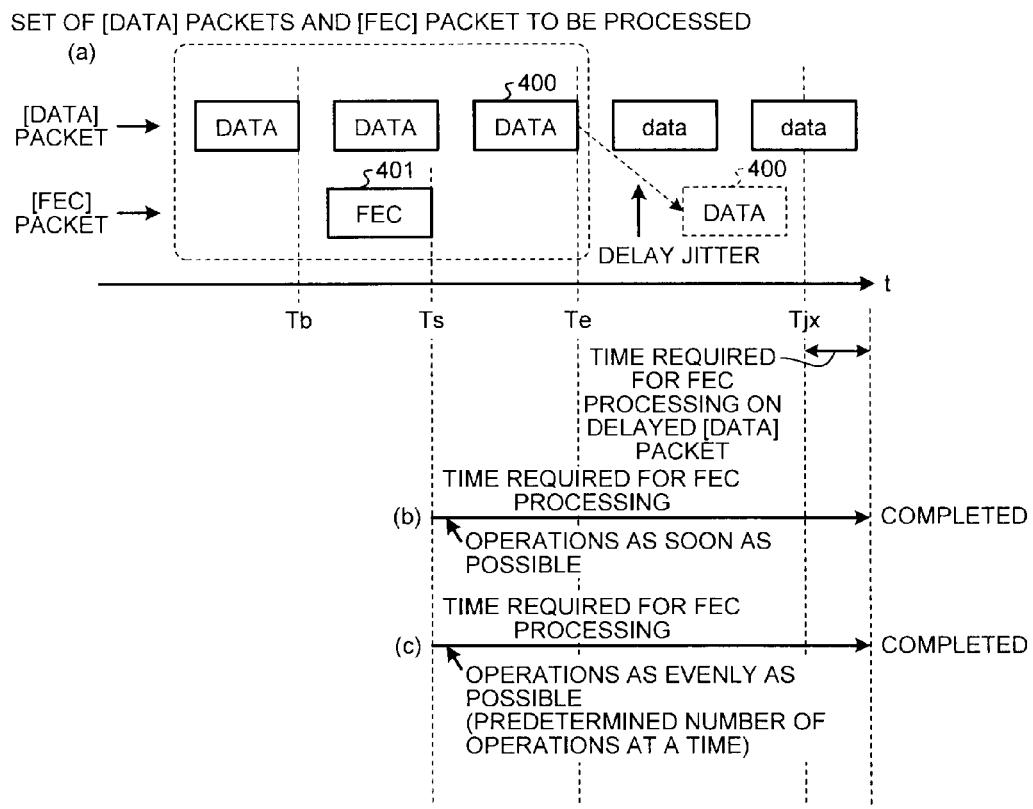
FIG. 5 is a chart comparing processing times for FEC processing between the related art and the embodiment.

According to such a configuration, the processing state of FEC processing on each FEC packet can be equalized and FEC processing on a plurality of FEC packets can be efficiently proceeded as illustrated in (c) of FIG. 5.

In the embodiment described above, when all of RTP packets associated with an FEC packet to be processed are obtained for performing FEC processing, the reception processing device 50 may skip the FEC processing. In this case, there is no lost RTP packet in a group of RTP packets associated with the FEC packet. Therefore, since it is not necessary to recover a lost packet, FEC processing therefor need not be performed. However, in terms of efficient utilization of the CPU or the like, the reception processing device 50 may perform FEC processing even if all of the RTP packets associated with the FEC packet to be processed are obtained.

In the embodiment describe above, although the association storage 69 and the quality enhancement processing state storage 70 are configured as separate storages, these may be integrated. Thus, the reception processing device 50 may store an FEC packet buffered in the quality enhancement packet buffer 66 and RTP packets associated with the FEC packet and buffered in the data packet buffer 67, and a processing state of FEC processing performed using these packets in a form of one table, data graphically representing the packets and the state or a file.

Moreover, the association between an FEC packet and RTP packets associated with the FEC packet is not limited to the example described above, and need not be in a form using sequence numbers or in a form of a matrix or a graph, for example.

While certain embodiments have been described, these embodiments have been presented by way of example only, and are not intended to limit the scope of the inventions. Indeed, the novel embodiments described herein may be embodied in a variety of other forms; furthermore, various omissions, substitutions and changes in the form of the embodiments described herein may be made without departing from the spirit of the inventions. The accompanying claims and their equivalents are intended to cover such forms or modifications as would fall within the scope and spirit of the inventions.

What is claimed is:

1. A reception processing device comprising:
a first receiving unit configured to receive a data packet;
a first storage unit configured to store the data packet;
a second receiving unit configured to receive a quality enhancement packet, the quality enhancement packet including redundant data for recovering a lost data packet and first identification information identifying a plurality of data packets used for generating the redundant data;
a second storage unit configured to store the quality enhancement packet;
a first processing unit configured to resolve disturbance of the data packet;
a third storage unit configured to store, at each quality enhancement processing performing an operation to recover a lost data packet, a processing state representing the first identification information of the data packet used for the operation among the data packets corresponding to the quality enhancement packet, and at least one of second identification information identifying the quality enhancement packet, an interim result and a final result of the operation in the quality enhancement processing;
a second processing unit configured to perform the quality enhancement processing using the redundant data included in the quality enhancement packet and the data packet identified by the identification information and stored in the first storage unit; and
a third processing unit configured to store, in the first storage unit, a lost first data packet when the first data packet is recovered by the final result of the operation, wherein the second processing unit is configured to
store in the third storage unit, when interrupting the quality enhancement processing, the processing state representing the second identification information identifying the quality enhancement packet used for the operation, the interim result of the operation and the first identification information of the data packet used for the operation,
perform, when receiving a new quality enhancement packet after interrupting the quality enhancement processing, the quality enhancement processing using the redundant data included in the new quality enhancement packet and the data packet identified by the first identification information and stored in the first storage unit, and
reopen, when reopening the interrupted quality enhancement processing, the quality enhancement processing using the data packet not used for the operation among the data packets identified by the first identification information and stored in the first storage unit, the quality enhancement packet identified by the second identification information indicated by the processing state stored in the third storage unit and the interim result of the operation indicated by the processing state stored in the third storage unit.

2. The reception processing device according to claim 1, wherein when the first data packet is recovered as a result of performing the quality enhancement processing, the second processing unit outputs the first data packet that is the final result of the operation to the third processing unit, and deletes the processing state of the quality enhancement processing from the third storage unit.

3. The reception processing device according to claim 1, wherein when there is no lost data packet as a result of performing the quality enhancement processing, the second processing unit deletes the processing state of the quality enhancement processing from the third storage unit.

4. The reception processing device according to claim 1, wherein the second processing unit repeats interrupting the quality enhancement processing after performing the operation using a predetermined number of data packets among data packets identified by the first identification information and stored in the first storage unit, storing the processing state in the third storage unit, and resuming the quality enhancement processing by performing the operation using a predetermined number of data packets that have not been used for the operation and the interim result of the operation indicated by the processing state on the quality enhancement packet.

5. The reception processing device according to claim 1, wherein
the first receiving unit receives a data packet according to a real-time transport protocol (RTP), and
the second receiving unit receives a quality enhancement packet according to the RTP.

6. The reception processing device according to claim 1, wherein the second processing unit performs the quality enhancement processing of performing an exclusive OR operation between the redundant data and the data packets used for generating the redundant data.

7. A reception processing method comprising:
a first receiving step of receiving a data packet;
a first storage step of storing the data packet in a first storage unit;
a second receiving step of receiving a quality enhancement packet, the quality enhancement packet including redundant data for recovering a lost data packet and first identification information identifying a plurality of data packets used for generating the redundant data;
a second storage step of storing the quality enhancement packet in a second storage unit;
a first processing step of resolving disturbance of the data packet;
a third storage step of storing in a third storage unit, at each quality enhancement processing performing an operation to recover a lost data packet, a processing state representing the first identification information of the data packet used for the operation among the data packets corresponding to the quality enhancement packet, and at least one of second identification information identifying the quality enhancement packet, an interim result and a final result of the operation in the quality enhancement processing;
a second processing step of performing the quality enhancement processing using the redundant data included in the quality enhancement packet and the data packet identified by the identification information and stored in the first storage unit; and
a third processing step of storing, in the first storage unit, a lost first data packet when the first data packet is recovered by the final result of the operation, wherein
the second processing step includes storing in the third storage unit, when interrupting the quality enhancement processing, the processing state representing the second identification information identifying the quality enhancement packet used for the operation, the interim result of the operation and the first identification information of the data packet used for the operation,
performing, when receiving a new quality enhancement packet after interrupting the quality enhancement processing, the quality enhancement processing using the redundant data included in the new quality enhancement packet and the data packet identified by the first identification information and stored in the first storage unit, and
reopening, when reopening the interrupted quality enhancement processing, the quality enhancement processing using the data packet not used for the operation among the data packets identified by the first identification information and stored in the first storage unit, the quality enhancement packet identified by the second identification information indicated by the processing state stored in the third storage unit and the interim result of the operation indicated by the processing state stored in the third storage unit.

8. A non-transitory computer-readable recording medium that stores therein a computer program for causing a computer to execute a reception processing method, the method comprising:
a first receiving step of receiving a data packet;
a first storage step of storing the data packet in a first storage unit;
a second receiving step of receiving a quality enhancement packet, the quality enhancement packet including redundant data for recovering a lost data packet and first identification information identifying a plurality of data packets used for generating the redundant data;
a second storage step of storing the quality enhancement packet in a second storage unit;
a first processing step of resolving disturbance of the data packet;
a third storage step of storing in a third storage unit, at each quality enhancement processing performing an operation to recover a lost data packet, a processing state representing the first identification information of the data packet used for the operation among the data packets corresponding to the quality enhancement packet, and at least one of second identification information identifying the quality enhancement packet, an interim result and a final result of the operation in the quality enhancement processing;
a second processing step of performing the quality enhancement processing using the redundant data included in the quality enhancement packet and the data packet identified by the identification information and stored in the first storage unit; and
a third processing step of storing, in the first storage unit, a lost first data packet when the first data packet is recovered by the final result of the operation, wherein
the second processing step includes storing in the third storage unit, when interrupting the quality enhancement processing, the processing state representing the second identification information identifying the quality enhancement packet used for the operation, the interim result of the operation and the first identification information of the data packet used for the operation,
performing, when receiving a new quality enhancement packet after interrupting the quality enhancement processing, the quality enhancement processing using the redundant data included in the new quality enhancement packet and the data packet identified by the first identification information and stored in the first storage unit, and
reopening, when reopening the interrupted quality enhancement processing, the quality enhancement processing using the data packet not used for the operation among the data packets identified by the first identification information and stored in the first storage unit, the quality enhancement packet identified by the second identification information indicated by the processing state stored in the third storage unit and the interim result of the operation indicated by the processing state stored in the third storage unit.

* * * * *